(12) United States Patent
Ganz et al.

(10) Patent No.: US 8,464,166 B2
(45) Date of Patent: Jun. 11, 2013

(54) FRIENDS LIST MANAGEMENT

(75) Inventors: Howard Ganz, North York (CA); Karl Joseph Borst, Toronto (CA); Sally Christensen, Richmond Hill (CA)

(73) Assignee: Ganz, Woodbridge, Ontario ( * ) Notice: Subject to any disclaimer, the term of this patent is extended or adjusted under 35 U.S.C. 154(b) by 320 days.

(21) Appl. No.: 12/369,349

(22) Filed: Feb. 11, 2009

(65) Prior Publication Data
US 2009/0204908 A1 Aug. 13, 2009

Related U.S. Application Data

(60) Provisional application No. 61/027,549, filed on Feb. 11, 2008.

(51) Int. Cl.
*G06F 3/048* (2006.01)
*G06F 3/00* (2006.01)
*G06Q 99/00* (2006.01)

(52) U.S. Cl.
USPC .......................... 715/757; 715/758; 705/319

(58) Field of Classification Search
USPC .................................. 715/757, 758; 709/319
See application file for complete search history.

(56) References Cited

U.S. PATENT DOCUMENTS

| | | | |
|---|---|---|---|
| 5,411,259 A | 5/1995 | Pearson | |
| 5,880,731 A | 3/1999 | Liles et al. | |
| 6,009,458 A | 12/1999 | Hawkins et al. | |
| 6,219,045 B1 | 4/2001 | Leahy et al. | |
| 6,396,509 B1 | 5/2002 | Cheng | |
| 6,493,001 B1 | 12/2002 | Takagi et al. | |
| 6,539,400 B1 | 3/2003 | Bloomfield et al. | |
| 6,559,863 B1 | 5/2003 | Megiddo | |

(Continued)

FOREIGN PATENT DOCUMENTS

| | | |
|---|---|---|
| CA | 2252008 A1 | 1/2008 |
| GB | 2365364 | 2/2002 |

(Continued)

OTHER PUBLICATIONS

Webkinz(TM)—A Tour of Webkinz World, as of Feb. 10, 2007, retrieved from the internet via http://replay.web.archive.org/20070210003044/http://www.webkinz.com/? on May 18, 2011. Selected excerpts applicable to U.S. Appl. No. 12/369,349 showing nearly every claimed feature was on sale and available to the public at that time. 13 pages.*

(Continued)

*Primary Examiner* — Steven Sax
*Assistant Examiner* — Wilson Varga
(74) *Attorney, Agent, or Firm* — Pearne & Gordon LLP (57) ABSTRACT

A method and system of managing a user's friends in a virtual environment are presented. The method includes interacting a virtual character with a plurality of additional virtual characters in response to commands input from the user entered via the user computer. A subset of the additional users, the additional virtual characters, or a combination of the additional users and the additional virtual characters are designated as friends of the user in the virtual environment, and the friends are added to a list of friends associated with the user. The friends on the list displayed to the user can be ranked in an order based at least in part on the interacting of the virtual character controlled by the user with the plurality of additional virtual characters in the virtual environment.

21 Claims, 9 Drawing Sheets

U.S. PATENT DOCUMENTS

| | | |
|---|---|---|
| 6,595,858 B1 | 7/2003 | Tajiri et al. |
| 6,677,968 B1* | 1/2004 | Appelman .................... 715/853 |
| 6,722,973 B2 | 4/2004 | Akaishi |
| 6,734,885 B1 | 5/2004 | Matsuda |
| 6,773,325 B1 | 8/2004 | Mawle et al. |
| 6,773,344 B1 | 8/2004 | Gabai et al. |
| 6,910,186 B2 | 6/2005 | Kim |
| 6,948,131 B1 | 9/2005 | Neven et al. |
| 7,037,166 B2 | 5/2006 | Schrock et al. |
| 7,058,897 B2 | 6/2006 | Matsuda |
| 7,143,358 B1 | 11/2006 | Yuen |
| 7,155,680 B2 | 12/2006 | Akazawa et al. |
| 7,171,154 B2 | 1/2007 | Fujisawa |
| 7,181,690 B1 | 2/2007 | Leahy et al. |
| 7,210,104 B2 | 4/2007 | Nakagawa |
| 7,249,139 B2 | 7/2007 | Chuah et al. |
| 7,288,028 B2* | 10/2007 | Rodriquez et al. .............. 463/42 |
| 7,314,407 B1 | 1/2008 | Pearson |
| 7,342,587 B2* | 3/2008 | Danzig et al. ................. 345/473 |
| 7,478,047 B2 | 1/2009 | Loyall et al. |
| 7,488,231 B2 | 2/2009 | Weston |
| 7,908,324 B2 | 3/2011 | Shochet et al. |
| 2002/0068500 A1 | 6/2002 | Gabai et al. |
| 2003/0061161 A1 | 3/2003 | Black |
| 2003/0065721 A1* | 4/2003 | Roskind ........................ 709/204 |
| 2004/0043806 A1 | 3/2004 | Kirby et al. |
| 2004/0093266 A1 | 5/2004 | Dohring |
| 2004/0153557 A1 | 8/2004 | Shochet et al. |
| 2004/0242326 A1 | 12/2004 | Fujisawa et al. |
| 2005/0059483 A1 | 3/2005 | Borge |
| 2005/0137015 A1 | 6/2005 | Rogers et al. |
| 2005/0177428 A1 | 8/2005 | Ganz |
| 2005/0192864 A1* | 9/2005 | Ganz ............................... 705/14 |
| 2005/0250415 A1 | 11/2005 | Barthold |
| 2005/0250416 A1 | 11/2005 | Barthold |
| 2005/0272504 A1 | 12/2005 | Eguchi et al. |
| 2006/0093142 A1 | 5/2006 | Schneier et al. |
| 2006/0100018 A1 | 5/2006 | Ganz |
| 2006/0123127 A1 | 6/2006 | Littlefield |
| 2006/0166593 A1 | 7/2006 | Schrock et al. |
| 2006/0293103 A1 | 12/2006 | Mendelsohn |
| 2007/0050716 A1 | 3/2007 | Leahy et al. |
| 2007/0060368 A1 | 3/2007 | Cheng |
| 2007/0121843 A1 | 5/2007 | Atazky et al. |
| 2008/0056269 A1* | 3/2008 | Madhani et al. ............ 370/395.2 |
| 2008/0115087 A1* | 5/2008 | Rollin et al. .................. 715/811 |
| 2008/0163055 A1 | 7/2008 | Ganz et al. |
| 2008/0221998 A1 | 9/2008 | Mendelsohn et al. |
| 2009/0254843 A1* | 10/2009 | Van Wie et al. ............... 715/757 |

FOREIGN PATENT DOCUMENTS

| | | |
|---|---|---|
| JP | 2001-321571 A | 11/2001 |
| JP | 2001-522498 A | 11/2001 |
| JP | 2002063092 | 2/2002 |
| JP | 2003-248650 A | 9/2003 |
| WO | 99/42917 A2 | 8/1999 |
| WO | 0102072 A1 | 1/2001 |
| WO | 01/69829 A2 | 9/2001 |
| WO | 02099581 A2 | 12/2002 |

OTHER PUBLICATIONS

Webkinz—A Tour of Webkinz World, as it existed on Feb. 10, 2007, retrieved from the internet via http://replay.web.archive.org/20070210003044/http://www.webkinz.com/? on Nov. 14 & 15, 2011. 7 pages.*

Robbins, Sarah et al., Second Life For Dummies, Jan. 15, 2008, For Dummies, ISBN: 978-0-470-18025-9, pp. ii, 2-14, 20-23, 39-43, 70-71, 97-107, 109-129, 174-191.*

White, Brian A., Second Life: A Guide to Your Virtual World, Aug. 21, 2007, Que, ISBN-10: 0-321-50166-7, pp. 47-60.*

Microsoft Computer Dictionary, 2002, Microsoft Press, pp. iv, 149, 292.*

Grace, "Web Site Tycoon's Next Goal: Sixth Grade"; Woonsocket Call, Jun. 19, 2002.

http://web.archive.org.web.20031202190119/www.monopets.com/ ,Dec. 2, 2003.

* cited by examiner

FRIENDS LIST MANAGEMENT

CROSS-REFERENCE TO RELATED APPLICATIONS

This application claims the benefit of U.S. Provisional Application No. 61/027,549, filed Feb. 11, 2008, the entirety of which is incorporated herein by reference.

BACKGROUND OF THE INVENTION

1. Field of the Invention

This application relates generally to a method and system for organizing a database of friends in a virtual environment, and more specifically to method and system for ranking virtual friends in a virtual environment based at least in part on interactions with the virtual friends.

2. Description of Related Art

In virtual environments such as video games, users typically control a virtual character through a series of adventures within the virtual environment. The virtual characters in some virtual environments may take on a life of their own, each having an affinity for certain virtual items or activities in the virtual world that can optionally reflect the interests and tastes of the user. For example, a virtual character can have a personality trait in the virtual world such as a like or dislike for certain types of virtual foods. Virtual characters can also exhibit a temperament towards other virtual characters based on the value of a parameter representing the health, hunger or happiness of that virtual character. When a user controlling a first virtual character encounters another virtual character in the virtual environment having qualities similar to the first virtual character, the user may wish to add the other virtual character to a character's list of friends. Users may also wish to add other users who they know personally, or the virtual characters of those other users, to join their own virtual character's list of friends. By keeping a list of friends, the user can easily locate and communicate with his or her friends each time the user visits the virtual environment.

To add a user to a list of friends maintained on behalf of a virtual character, a formal invitation can be transmitted to the user being invited (hereinafter the "Invitee"). The Invitee can accept the invitation and the Invitee's virtual character, or the Invitee himself, is added to a list of friends associated with the virtual character of the user, or the user himself, that extended the invitation (hereinafter the "Inviter"). Due to limited computer resources for generating and maintaining the virtual environment, the number of friends each user can include on a list of friends is typically capped at a predetermined number of users.

Over time, however, a user's list of friends can grow quite long and include many users and/or virtual characters. During that time, some users on the list may no longer visit the virtual environment, or their interests may have changed since initially being added to the another user's list of friends. Thus, the limited number of entries on a user's list of friends may include several entries that are not current. That could be replaced by current friends. Users may want to replace friends on the list that they have grown apart from with current friends.

Further, the success and popularity of virtual environments such as those presented as a website accessible over a communication network may be judged based on the number of visitors that website the website receives. Interest in a new virtual environment can keep a user attracted to a virtual environment for an initial period of time. Encouraging users to visit the virtual environment over time once the initial interest has worn off can be difficult.

BRIEF SUMMARY

According to one aspect, the subject application involves a method of managing a user's friends in a virtual environment presented to the user via a user computer. The method includes representing a toy in the virtual environment with a virtual character that can be controlled by the user via the user computer, and establishing a user account for the user in said virtual environment and associating the virtual character with the user account. A plurality of additional virtual characters representing additional toys are provided in the virtual environment, wherein additional users are associated with the plurality of additional virtual characters and can control the additional virtual characters in the virtual environment via other user computers operatively connected to the user computer over at least one communication network. The virtual character is interacted with the plurality of additional virtual characters in response to commands input from the user entered via the user computer. A subset of the additional users, the additional virtual characters, or a combination of the additional users and the additional virtual characters is designated as friends of the user in the virtual environment and the friends are added to a list of friends associated with the user account to be displayed to the user via the user computer. The friends on the list displayed to the user can be ranked in an order based at least in part on the interacting of the virtual character controlled by the user with the plurality of additional virtual characters in the virtual environment.

According to another aspect, the subject application also involves a web server system including a network connection port through which content is to be served over a communication network to a user computer and a plurality of additional user computers for generating a virtual environment on a website to be viewed by a user via the user computer and by a plurality of additional users via the plurality of additional user computers. The network connection port is configured to serve outbound content to at least ten (10) concurrent client connections over the communication network. A plurality of computer-readable memory modules are also provided, forming a redundant storage array operatively connected to the web server system for storing the outbound content to be served via the network connection port. A plurality of the computer-readable memory modules of the redundant array store substantially similar content to provide at least one backup copy of the substantially similar content. The substantially similar content stored by the computer-readable memory modules to be served over the communication network to the user computer can include a virtual character that can be controlled by the user in the virtual environment via the user computer, a plurality of additional virtual characters that can be controlled by the plurality of additional users in the virtual environment, and a list of friends. The list of friends can include the plurality of additional characters, the plurality of additional users, or a combination including at least one of the additional characters and at least one of the additional users that have been selected as friends by the user in the virtual environment. The friends on the list can be ranked in order based at least in part on interactions between the virtual character controlled by the user and the plurality of additional virtual characters in the virtual environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

As described above, many users have many entries on their friends list. However, due to the length of some lists, identifying entries on the list representing former acquaintances that can be replaced with current acquaintances can be time consuming.

Accordingly, there is a need in the art for a method and system for generating a virtual environment that includes a list of friends associated with a user. The list of friends can include an indication of how close a friend on the list is to the user relative to another friend on the list, and the indication can be based at least in part on a number of interactions between the user and each of the friends. Thus, a user can quickly identify those friends in the virtual environment with whom the user has the closest relationship to engage those close friends in games, chat sessions or other activities in the virtual environment.

Figure 1:
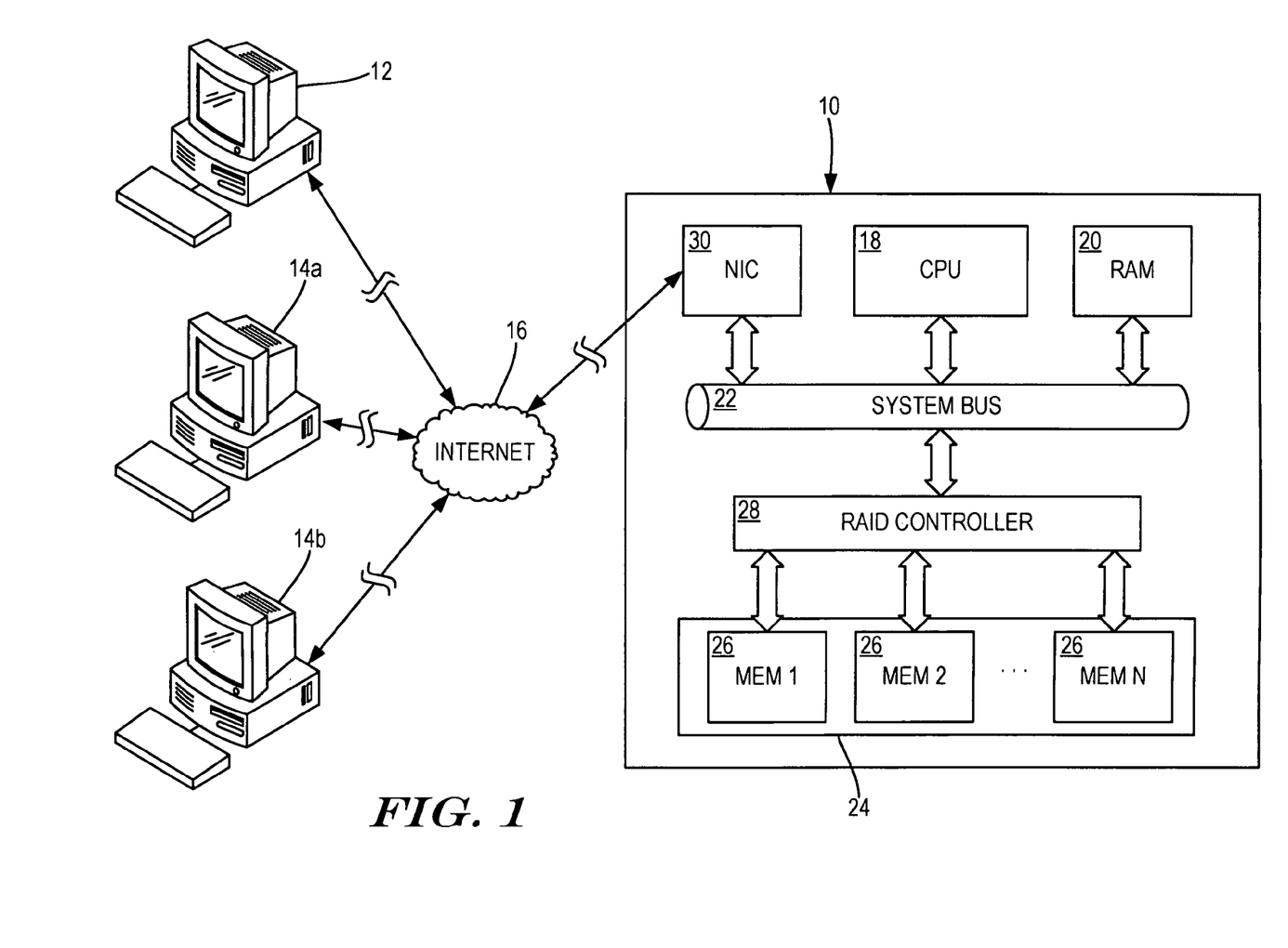
FIG. 1 shows a block diagram schematically depicting a web server system in communication with a user computer and a plurality of additional user computers over a communication network.

An embodiment as described herein describes a method and system for generating a virtual entertainment in which a user can manage a list 40 (FIG. 4) of friends and rank friends based at least in part on interactions that have occurred between the user's virtual character 32 (FIG. 3) and other virtual characters in the virtual environment. FIG. 1 shows a block diagram schematically illustrating an embodiment of a web server system 10 connected to a user computer 12 and a plurality of additional user computers 14a, 14b over a communication network 16 such as the Internet. As shown, the web server system 10 includes a central processing unit ("CPU") 18 that can optionally include a plurality of multi-core microprocessors such as the Intel® Xenon® line of quad-core processors. Volatile temporary memory commonly referred to as RAM 20 is accessible to the CPU 18 via a system bus 22 to temporarily store electronic data to be processed by the CPU 18.

The web server system 10 is operatively connected to communicate with a redundant array 24 of computer-readable memory modules 26 that can be implemented as separate physical hard drives, or a single partitioned hard drive, for example. Such an arrangement is commonly referred to as a RAID, and allows for use of at least two of the memory modules 26 to provide redundant storage of electronic data to minimize data loss in the event a problem is encountered with one of the memory modules 26. The redundant array 24 can optionally be integral with the web server system 10 as shown in FIG. 1, or optionally an external storage device operatively connected to receive and store content on behalf of the web server system 10.

The redundant array 24 includes a RAID controller 28 to control the redundant storage of electronic data defining content to be served over the communication network 16 in the memory modules 26. The RAID controller 28 can be implemented by hardware or software provided to the web server system 10. A hardware embodiment of the RAID controller 28 can create the appearance of a single computer-readable memory to the system bus 22, but operate independently to provide redundant storage of the content in a plurality of the memory modules 26. A software embodiment of the RAID controller 28 is stored in a computer-readable memory provided to the web server system 10 such as one of the memory modules 26. With the software, examples of which include Veritas Volume Manager for the Solaris system, and Adaptec's AAA-RAID controllers, the web server system 10 treats each partition forming a memory module 26 as a separate computer-readable memory in communication with the system bus 22.

Among other information, a plurality of the memory modules 26 can each store substantially similar information for backup purposes. The substantially similar content stored by these memory modules 26 to be served over the communication network 16 to the user computer 12 can include at least one of: a virtual character 32 that can be controlled by the user in the virtual environment via the user computer 12, a plurality of additional virtual characters that can be controlled by the plurality of additional users in the virtual environment, and a list 40 of friends. The list 40 of friends can include the plurality of additional characters, the plurality of additional users, or a combination including at least one of the additional characters and at least one of the additional users that have been selected as friends by the user in the virtual environment as described in detail below. The friends on the list 40 can optionally be ranked in order based at least in part on interactions between the virtual character 32 controlled by the user and the plurality of additional virtual characters in the virtual environment as described below.

An operating system such as Microsoft Windows 2000 Server, and server software such as Apache HTTP Server, for example, can be stored on at least one of the memory modules 26. The operating system and server software govern operation of the web server system 10 and communications with the user computer 12 and additional user computers 14a, 14b over the communication network 16.

A network interface controller ("NIC") 30 is also operatively connected to communicate with the system bus 22 and control the communication of content between the web server system 10 and the user computer 12 and additional user computers 14a, 14b over the communication network 16. The NIC 30 can process the content to be served over the communication network 16 according to any suitable communication protocol such as TCP/IP, for example. The NIC 30 can be configured to serve outbound content to at least ten (10) concurrent client connections over the communication network 16.

A user can access the web server system 10 and register a toy provided with a registration code as described in U.S. Pat. No. 7,465,212 to Ganz, which is incorporated herein in its entirety by reference. By registering the toy in this manner, the user is granted access to a virtual character 32 (FIG. 3) in the virtual environment on the website, and can control the virtual character 32 therein to interact in a variety of different ways with additional virtual characters similarly registered by additional users via the additional user computer 14a, 14b. Having registered the toy, the user can select friends from among the total population of additional virtual characters, the additional users, or a combination of the additional virtual characters and the additional users in the virtual environment. The number of friends on the list 40 comprises fewer than the total number of additional users and additional virtual characters in the virtual environment. These friends can be arranged manually by the user or automatically by the user computer or web server in a virtual list 40 that is displayed to the user via the user computer 12. Friends can be ranked based at least in part on the number of interactions or frequency of interactions between the user's virtual character 32 and the virtual characters associated with each of the friends, or otherwise based at least partially on the interactions between such virtual characters.

More specifically, the user can access a website generated from content served from the web server system 10 by entering an appropriate URL in a web browser running on the user computer 12. The URL corresponds to an IP address of the web server system 10, which can optionally be a static IP address. The IP address is looked up from a domain name server ("DNS") and used to connect the user computer 12 to the web server system 10 over the communication network 16 and retrieve the desired website allowing the user to register the toy.

Figure 2:
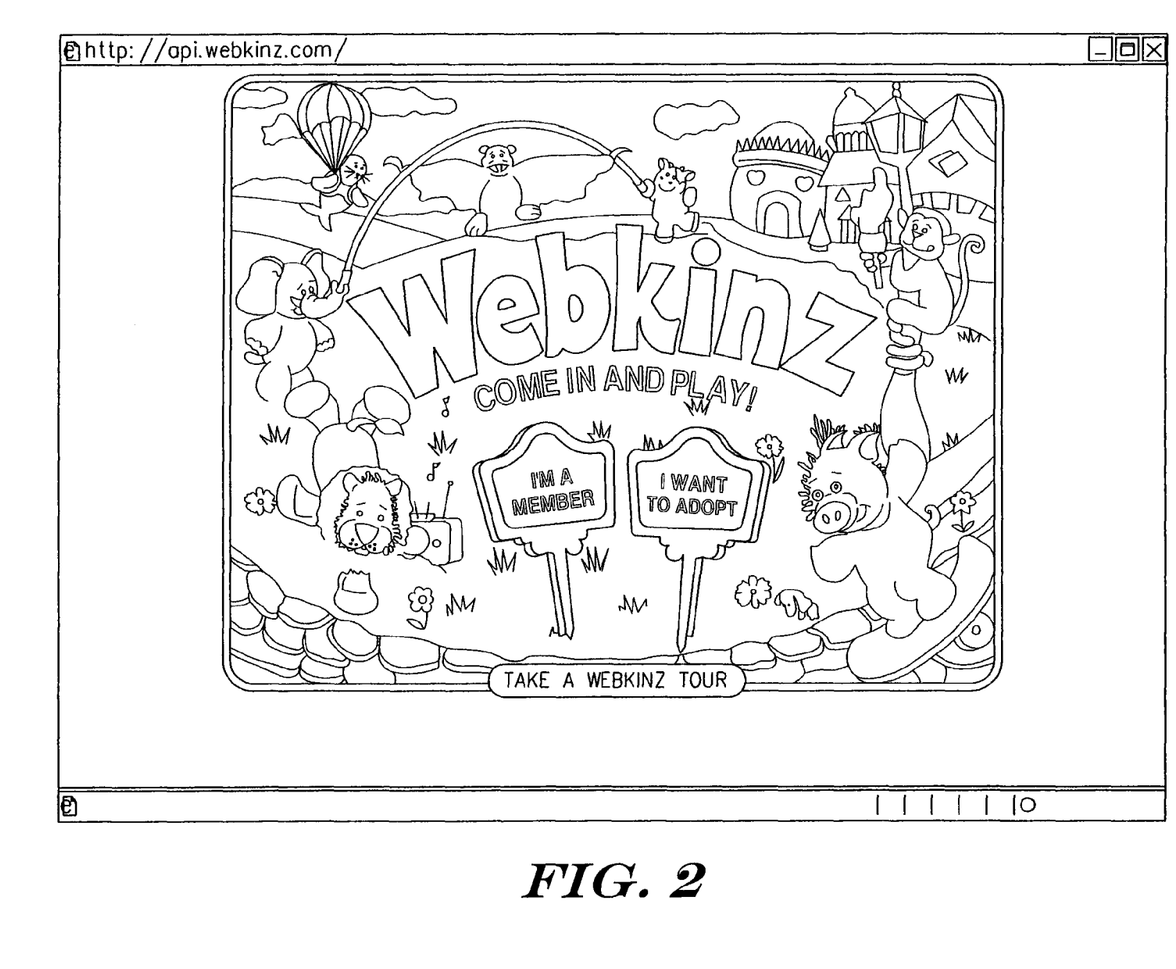
FIG. 2 shows an embodiment of a splash screen of a virtual environment in the form of a website.

The user can initially be directed to a splash page as shown in FIG. 2, from where the user can elect to log in if the user has already registered at least one toy and created a user account, or elect to register a first toy and create the user account. Returning users can select the "I'M A MEMBER" option in FIG. 2 and log onto the website using a username and password combination associated with the user's account created upon registering the first toy to re-enter the virtual environment.

New users registering their first toy to be associated with a new user account can select the "I WANT TO ADOPT" option on the splash page of the website shown in FIG. 2. In response to selecting this option the user is prompted to enter the registration code provided with the toy when purchased by the user at a retail location, for example. The user is then guided through a formal adoption process described in detail in the aforementioned Ganz patent. During the adoption process the user adopts the virtual character 32, which can optionally be a virtual replica of the toy, that will represent the toy in the virtual environment. The user can optionally name the virtual character 32, and select character traits at the time of adoption. The virtual character 32 is also associated with the user account so that each time the user subsequently logs onto the website via the user account the user can control the virtual character 32 in the virtual environment.

The toy purchased by the user and represented by the virtual character 32 in the virtual environment can be any object that can provide amusement to children or other users. Examples include, but are not limited to plush toys, plastic toys, die-cast toys, trading cards, figurines, and the like.

As more users register their toys by entering the respective registration code provided with those toys into the website via other user computers a population of registered users and virtual characters in the virtual environment is created. The population includes a plurality of additional virtual characters representing additional toys in the virtual environment. A variety of different toys can optionally be represented by a variety of different virtual characters in the virtual environment, and these virtual characters can each be associated with a user account created by a plurality of different additional users who can control the plurality of additional virtual characters in the virtual environment via the additional user computers 14a, 14b.

Figure 3:
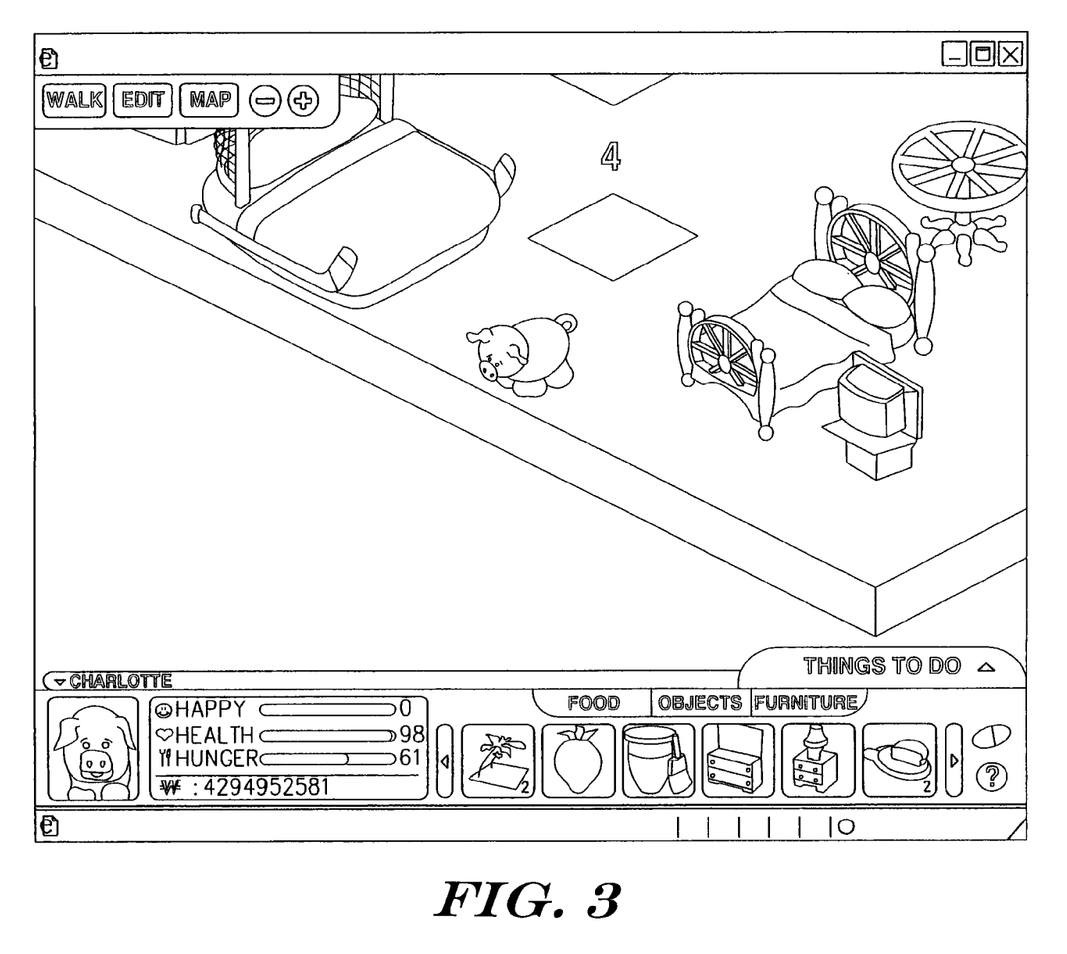
FIG. 3 shows a virtual character associated with a user account in a virtual room belonging to the virtual character.

Once the user has registered at least one toy and created the user account the user gains access to the virtual character 32, and can interact with and control the virtual character 32 in the virtual environment. In FIG. 3, the virtual character 32 is displayed by the user computer 12 in a virtual room 34 belonging to the virtual character 32. The user can collect and arrange virtual furnishings 36, virtual toys (not shown) for the virtual character 32 to play with, and other personalized items to customize the virtual room 34 to suit the personal taste of the user.

Access to the virtual room 34 can optionally be restricted to the user and his or her virtual character(s) 32. The user can select a subset of the additional users, additional virtual characters, or a combination thereof in the virtual environment as "friends." A user's friends are granted access to visit the virtual room 34 with their own virtual characters and view, and optionally interact with items such as the virtual furnishings 36 and virtual toys belonging to the virtual character 32 that are in the virtual room 34. Additional virtual characters that are not associated with a friend are prevented from viewing or interacting with such items.

Friends are also granted privileges in the virtual environment. These same privileges are not available to the remainder of the population that are not invited by the user to become friends of the user. For example, the user can be presented with an indication whether friends on the list are currently logged into the website, and can optionally search for and initiate communications with, and be contacted by friends. Friends in the virtual environment are analogous to friends in the real world. They are considered closer to the user than those who are merely members of the general population that have no connection with the user (i.e., virtual strangers).

Figure 4:
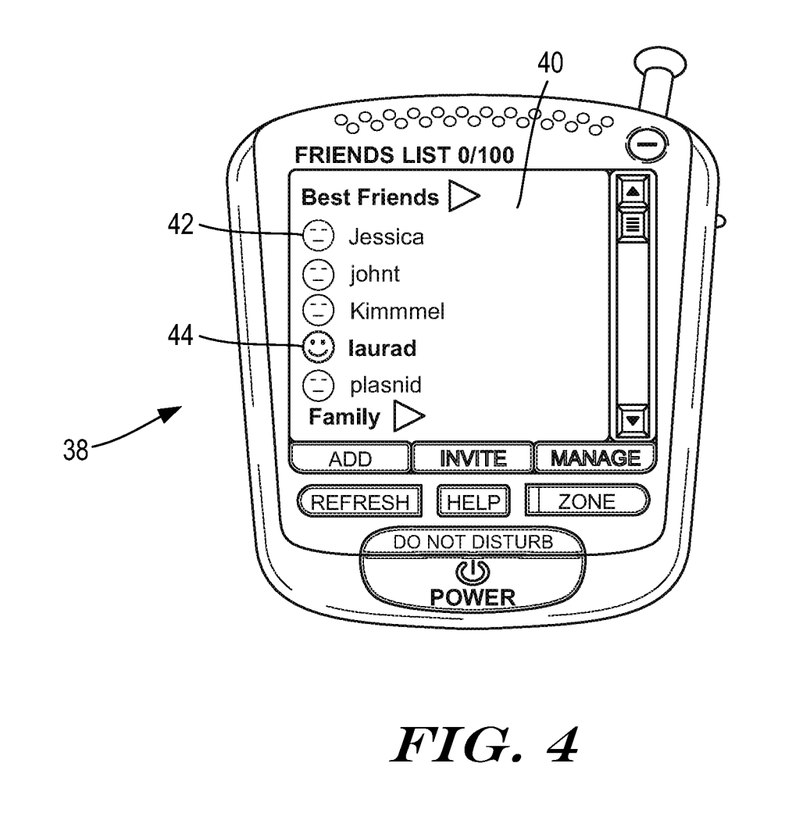
FIG. 4 shows an embodiment of a virtual telephone displaying a list of friends associated with a user.

As shown in FIG. 4, the user can access a virtual telephone 38 including a list 40 of the user's current friends. The list 40 can include names of the subset of additional users the user has become friends with, names of the virtual characters associated with those additional users, any other identifier, or any combination thereof. A sleeping face 42 lacking any facial expression next to friends on the list 40 in FIG. 4 identifies the friends of the user who are not currently logged in to the virtual environment. In contrast, the awake face 44 with a happy expression identifies the user, "laurad" who is currently logged in to the virtual environment, and who is currently available to interact with the user.

Each user can add friends to their friends list 40 by actively searching for known usernames or other identifiers, and subsequent to finding those individuals sending them an invitation in the virtual environment. Each user can also invite other additional users or additional virtual characters to become one of the user's friends upon interacting with the other additional users or additional virtual characters within the virtual environment. An interaction between virtual characters in the virtual environment can be any encounter, communication, competition, or other such action involving two or more virtual characters.

Figure 5:
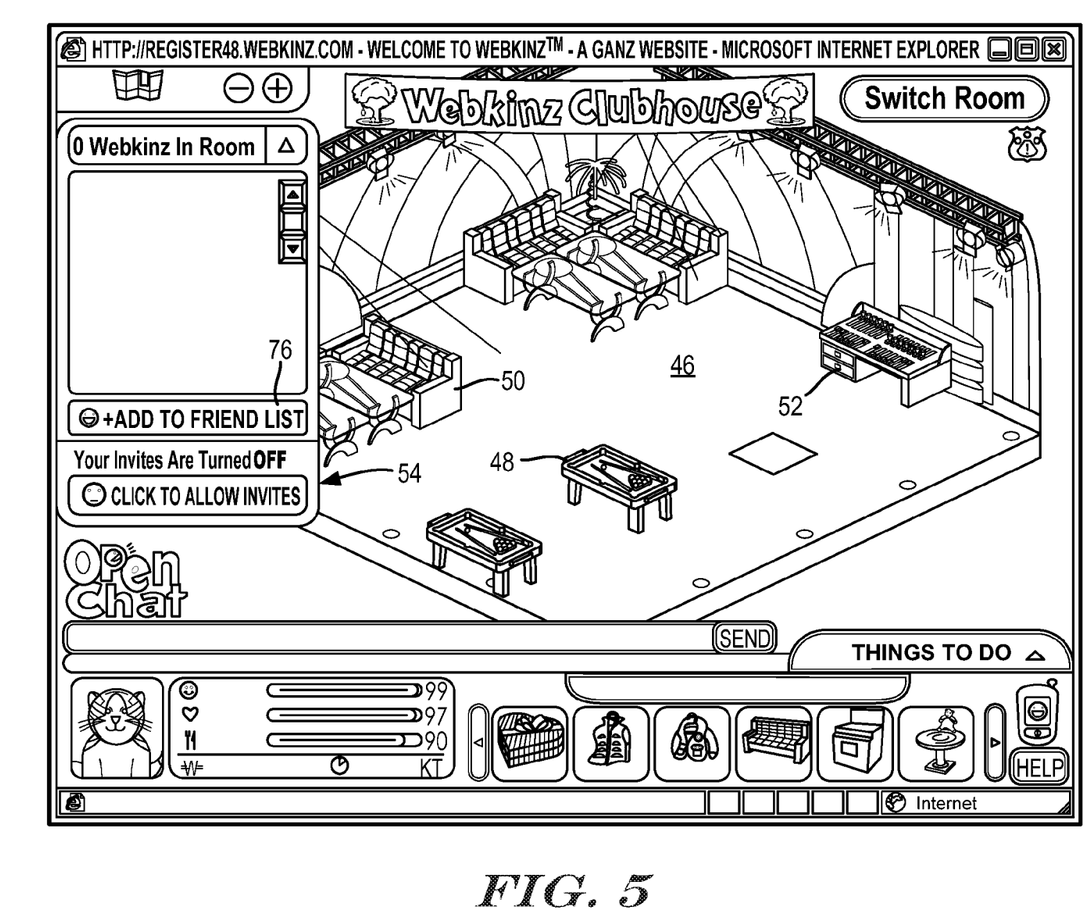
FIG. 5 shows an embodiment of a communal virtual room in the virtual environment where a virtual character associated with a user can encounter and interact with other virtual characters before the other virtual characters are associated with a friend of the user.

For example, the user can navigate the website and instruct the user's virtual character 32 to enter a communal room such as a Clubhouse 46, an example of which is shown in FIG. 5. The Clubhouse 46 can be unrestricted content served from the web server system 10, available to be accessed to all users in the general population with their respective virtual characters. The Clubhouse 46 can be considered a gathering place where virtual characters can encounter additional virtual characters, and view and possibly interact with those additional virtual characters before they are added to the user's list 40 of friends. A menu 54 is displayed in the virtual environment to the user by the user computer 12 (FIG. 1) to list all current occupants of the Clubhouse 46. The user can select one of the occupants by clicking on the occupant's identifier in the menu 54 with a mouse or other suitable input peripheral provided to the user computer 12 to initially engage the occupant, or the occupant's virtual character. During such an interaction the user can elect to extend an invitation to the selected occupant to be added to the user's list 40 (FIG. 4) of friends.

Figure 6:
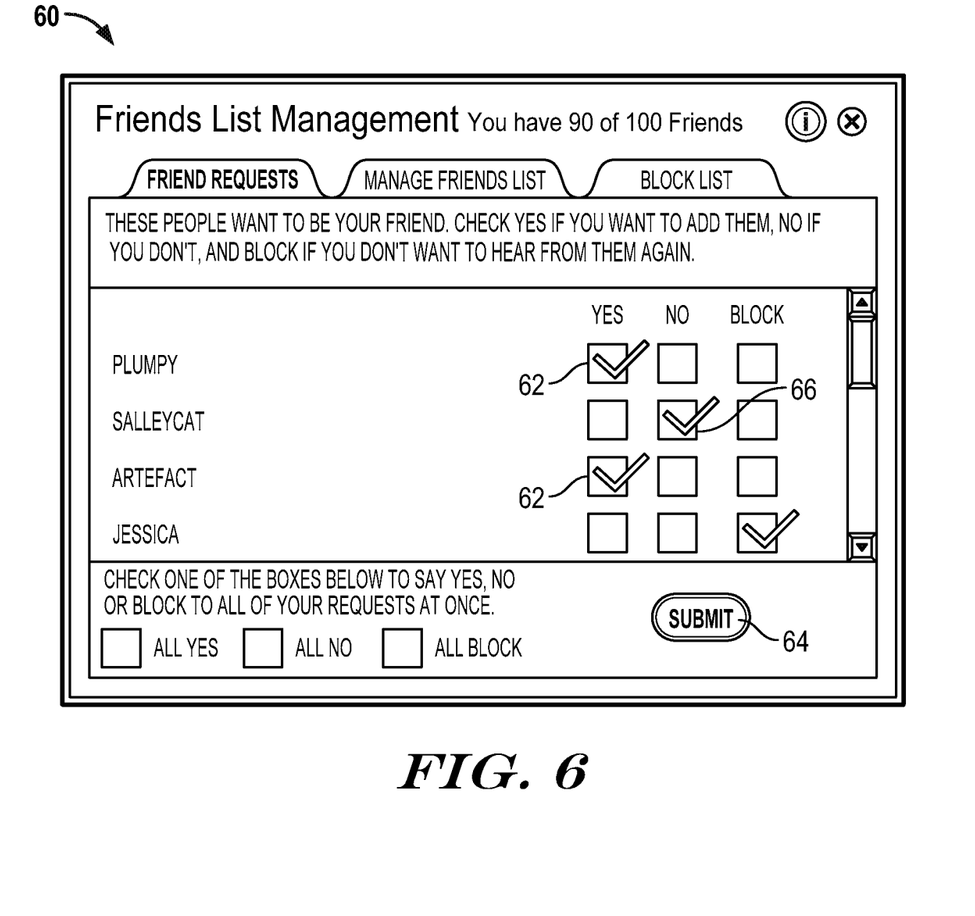
FIG. 6 shows an embodiment of a invitation management window allowing a recipient of an invitation to become a friend to a user to accept, decline or block the invitation.

The occupant receiving the invitation is presented with an invitation management window 60 such as that shown in FIG. 6. The invitation management window 60 presents to the occupant each of the occupant's invitations to enter into a friendship with various other additional users in the virtual environment. For the example shown in FIG. 6, the occupant has checked the appropriate check boxes 62 to accept the invitation to become friends with the additional virtual characters named Plumpy and ArteFact, which are controlled by, and associated with additional users in the virtual environment. When the "Submit" button 64 is selected, Plumpy and ArteFact will be added to the occupant's list 40 of friends, and the occupant will be added to the list 40 of friends associated with the user account for both Plumpy and ArteFact.

Similarly, the occupant has elected not to accept the invitation from the user associated with SalleyCat, and has indicated the desire to decline the invitation by selecting the appropriate check box 66. When the Submit button 64 is selected, neither SalleyCat nor the user associated with SalleyCat will be added to the occupant's list 40 of friends, and the occupant will also not be added to the list 40 of friends associated with SalleyCat. However, the ability of SalleyCat to extend future invitations to become friends to the occupant, and vice versa, remains a possibility.

The occupant has also elected to not only decline the invitation from Jessica, but also to block any future invitations to become friends sent from Jessica, or the user associated with Jessica. Blocking future invitations will prevent the user associated with Jessica from sending future friendship invitations, and optionally any future communications to the occupant. Selecting the Submit button 64 results in the addition of Jessica or the user associated with Jessica to the block list, from which she must be removed by the occupant before the occupant can receive any future invitations, and optionally future communications from Jessica in the virtual environment.

With reference to the system shown in FIG. 1, when the user decides to extend the invitation, the user computer 12 transmits a request to become friends over the communication network 16 to the web server system 10. Responsive to this request from the user that was entered via the user computer 12, the web server system 10 transmits an invitation over the communication network 16 to be subsequently received by the recipient(s) invited by the user to join the user's list 40 of friends. Should the recipient of the invitation accept, the web server system 10 receives an acceptance over the communication network 16 from each of the recipients that has agreed to become friends with the user and be added to the user's list 40 of friends. Each of the recipients that has transmitted their acceptance over the communication network 16 is subsequently added to the list 40 as friends.

Figure 7:
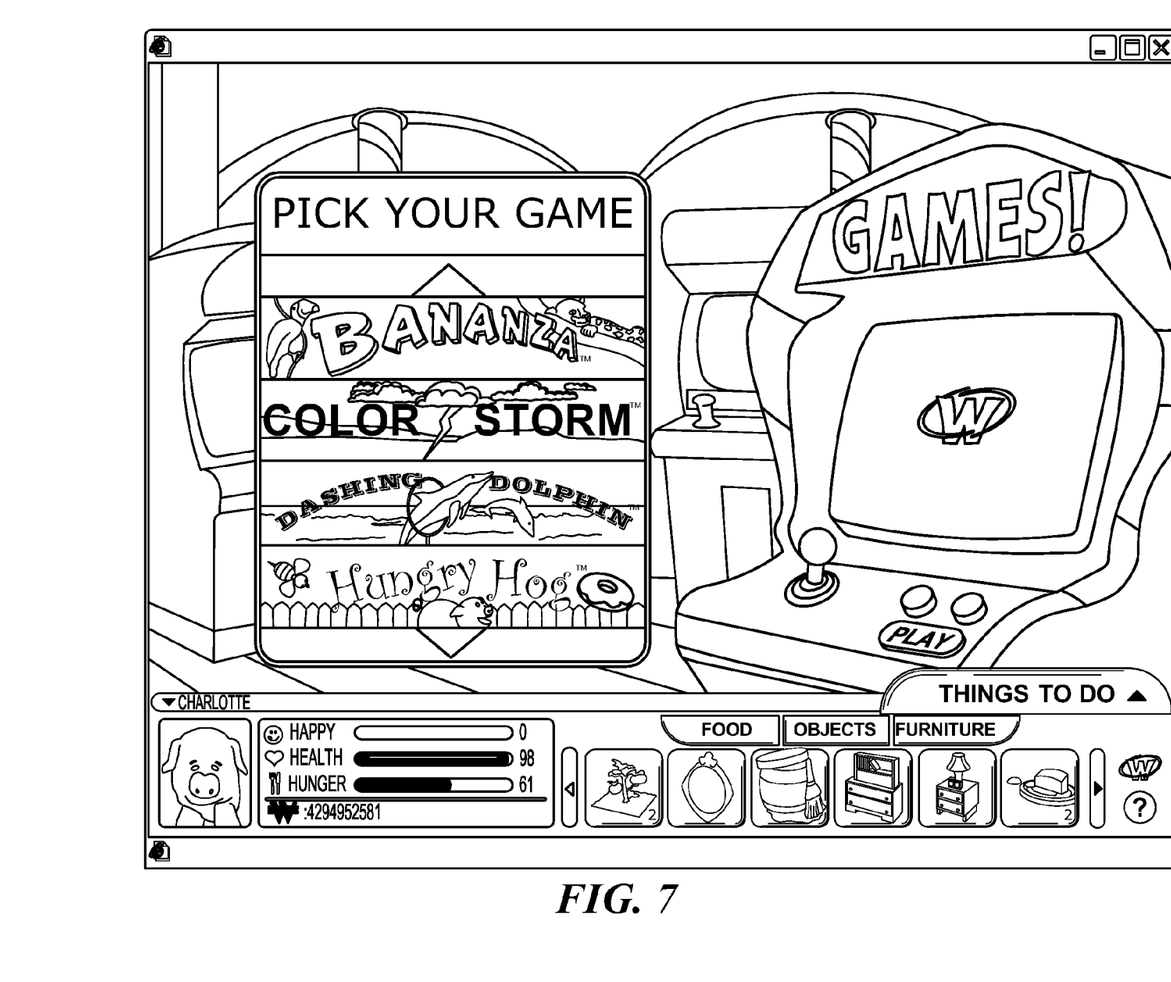
FIG. 7 shows an embodiment of an arcade menu.

Selecting the recipient(s) of an invitation to become friends from the menu 54 in FIG. 5 is but one example of an interaction between virtual characters in the virtual environment that can allow an invitation to become friends to be extended. Another example of such an interaction can also occur in the Clubhouse 46 of FIG. 5, where the user controls the virtual character 32 (FIG. 3) to interact with virtual furnishings such as billiard tables 48, couches 50, a sound board 52 for playing music, and the like. When the virtual character 32 interacts with the billiards table 48, for example, the virtual character 32 can optionally engage an additional virtual character that has also interacted with that same billiards table 48 in an activity such as a game of billiards. Alternately, the user can select a game in which to participate with his or her virtual character 32 against another virtual character in the virtual environment. FIG. 7 illustrates an example of an Arcade menu 70 listing a plurality of games that the user can participate in with his or her virtual character 32.

Figure 8:
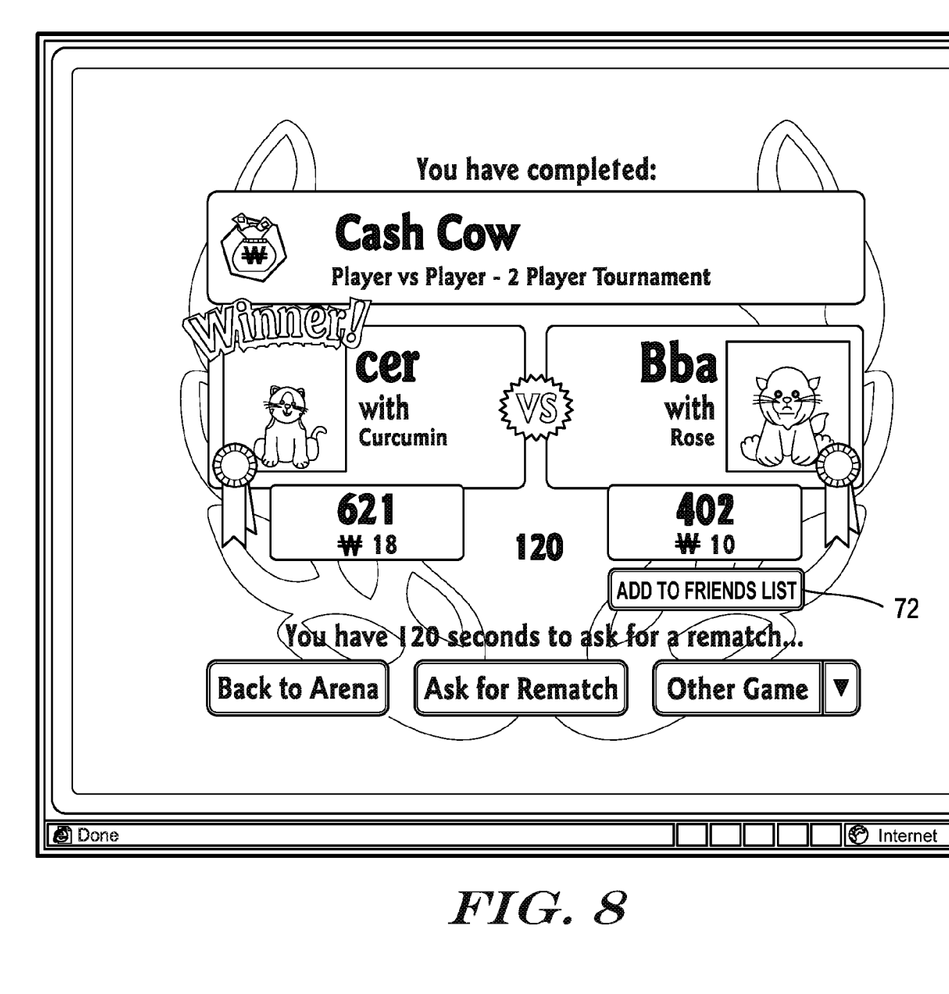
FIG. 8 shows an embodiment of a game result presenting a user an option to invite a friend.

Once the game has been selected, the user can optionally be presented with a list of one or more other participants that have already elected to participate in the selected game. After selecting the game, and optionally after completion of the game, the user can select one or more of the other participants and extend an invitation to become friends to the one or more other participants. For example, FIG. 8 shows the result of a completed game, which in this example is called "Cash Cow", pitting the user's virtual character "cer" against an additional virtual character called "Bba". An "ADD TO FRIENDS LIST" button 72 is displayed adjacent to the virtual character that the user competed against, allowing the user to extend an invitation to his or her competitor to add each other to their respective lists 40 of friends. If such an invitation is extended, the opponents in the game who receive the invitation can be presented with the invitation management window 60 such as that described above with respect to FIG. 6. Again, the invitation can be accepted, declined or the user (or the user's virtual character 32) blocked as described in detail above.

According to one embodiment, the number of friends on the user's list 40 can be limited to a predetermined maximum number of friends. If, for example, the user has the maximum allowable number of friends on the list 40 of friends associated with his user account, the option to extend further invitations can be made unavailable. The user will be prevented from adding friends to the list 40 if adding additional friends to the list 40 will cause the number of friends on the list 40 to exceed the predetermined maximum number. For example, the "ADD TO FRIEND LIST" button 76 in FIG. 5 can be deactivated, and grayed out to indicate to the user that the option to extend a friendship invitation is unavailable. Likewise, the "ADD TO FRIEND LIST" button 72 in FIG. 8 can also be deactivated, and grayed out for to again provide the visual indication that the option to extend further invitations is unavailable.

Regardless of the manner in which the user and the additional users in the virtual environment populate their lists 40 of friends, the lists 40 are associated with the user account of their respective users. Thus, the list 40 can evolve over time, and does not reset every time the user and additional users log into the virtual environment. The rank of each friend on a user's list 40 relative to other friends on the user's list 40 can also change based at least in part on interactions between the user's virtual character 32 and the virtual character of each friend on the list 40. The initial interaction between these virtual characters can result in the users being added to each others lists 40 of friends, but further interactions can affect how "close" (i.e., how highly ranked) each friend is to the user.

Figure 9:
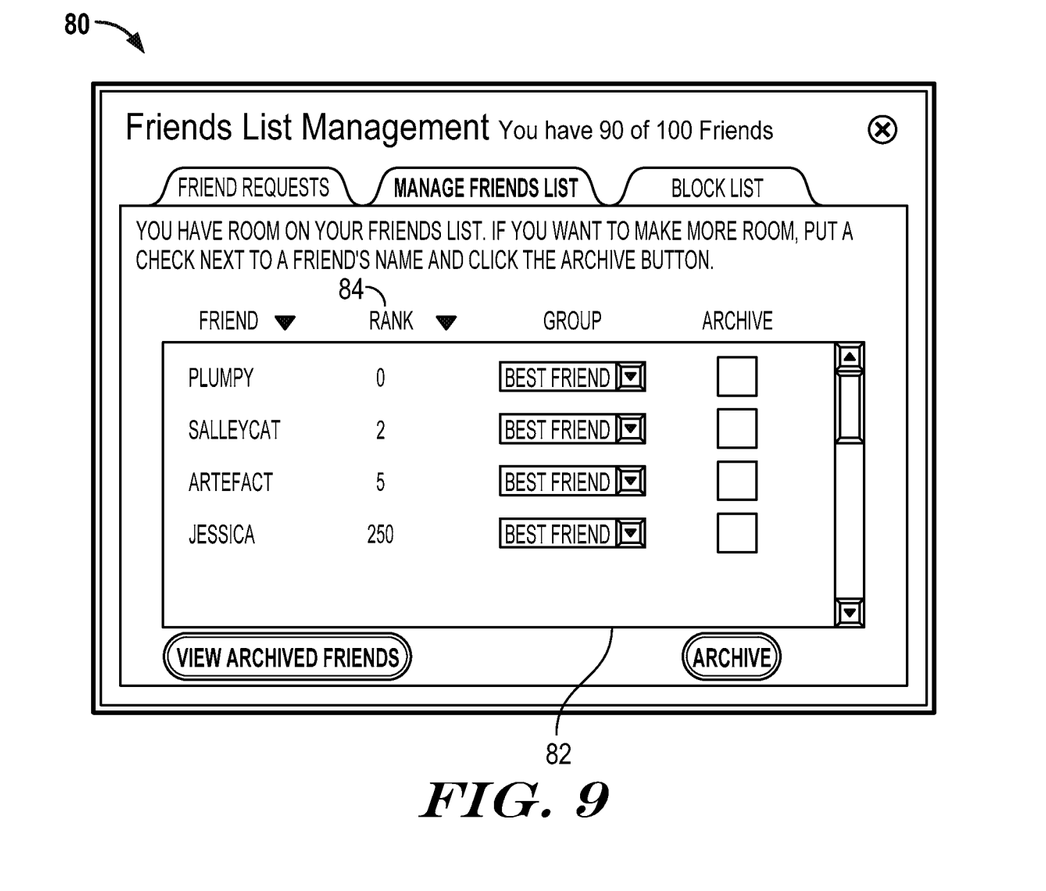
FIG. 9 shows a friends list management window displaying a ranking of friends.

FIG. 9 shows an example of a friends management window 80 served from the web server system 10 to the user computer 12 to be displayed to the user. The friends management window 80 includes a table 82 of friends, optionally grouped into categories of friends, sorted in an order of ascending rank (i.e., the highest ranked friends at the bottom and the lowest ranked friends at the top), as shown in the sorted rank column 84. The order of friends in the table 82 can be arranged by the user in an order of descending rank, alphabetically, by category, or by any other desired criteria.

The rank of each friend on the list 40 can be affected based on the interactions between the virtual character 32 associated with the user account of the user and the virtual character associated with each friend. According to an embodiment, the friends on the list 40 are ranked based on a number of interactions between the virtual character 32 associated with the user and the virtual character associated with each friend. Thus, a first friend is ranked higher than a second friend when a number of interactions between the virtual character 32 associated with the user and a first additional virtual character associated with the first friend is greater than a number of interactions between the virtual character 32 associated with the user and a second additional virtual character associated with the second friend. This ranking may be automatically done by the computer based on detection of these interactions.

The ranking of friends can optionally be based on a number of interactions occurring between the virtual character 32 associated with the user and each of the first and second additional virtual characters during a predetermined period of time before the ranking is performed. For example, the predetermined period of time can begin approximately when the user account associated with each friend is established and end approximately when the ranking is performed. In this example the number of interactions is the total number of interactions between the user's virtual character 32 and the virtual character associated with each friend on the list 40 over the entire existence of each friend. Alternately, the period of time can be limited to the period of time during which the friends are on the list 40 of friends associated with the user.

According to an alternate embodiment, the friends are ranked based on a frequency of interactions between the virtual character 32 associated with the user and the virtual character associated with each friend on the list 40. For example, a first friend can be ranked higher than a second friend according to such embodiments when a frequency of interactions between the virtual character 32 associated with the user and a first additional virtual character associated with a first friend is greater than a frequency of interactions between the virtual character 32 associated with the user and a second additional virtual character associated with the second friend.

The ranking of friends on the list 40 can occur periodically, at regular intervals of time such as every time a user logs onto the website via the user account. Alternately, the ranking of friends on the list 40 can occur substantially in real time upon each interacting of the virtual character 32 associated with the user with one or more of the additional virtual characters associated with the additional users.

The interactions between the virtual characters that can affect the ranking can be any encounter, communication, competition, or other such action involving the virtual character 32 associated with the user and an additional virtual character associated with a friend. For example, a friend can gain rank (i.e., obtain a higher ranking) relative to other friends every time the user: sends an instant message, note, e-mail, chat message, or otherwise communicates with the friend in the virtual environment over the communication network 16; transmits a request to the web server system 10 to transmit a virtual gift to the friend in the virtual environment; transmits an invitation over the communication network 16 inviting the friend to participate in a game in the virtual environment; transmits an invitation to the friend over the communication network 16 inviting the friend to visit the virtual room 34 belonging to the virtual character 32 associated with the user; participates in a virtual game involving the friend in the virtual environment; or otherwise engages or encounters the friend over the communication network 16.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of managing a user's friends in a virtual environment presented to the user via a user computer, the method comprising:

on a server computer, representing a toy in the real world as a virtual character in the virtual environment;

accepting commands from the user to control the virtual character;

establishing a user account for the user in said virtual environment and saving the virtual character with the user account;

registering a plurality of additional virtual characters in the virtual environment to additional users, wherein additional toys in the real world are represented by the additional virtual characters in the virtual environment and the additional users control the additional virtual characters in the virtual environment;

using the server computer for interacting the virtual character with the plurality of additional virtual characters in response to commands accepted from the user;

transmitting content for displaying, with the user computer, an interface populated with an identifier indicative of each of the plurality of additional users controlling one of the additional virtual characters present in a communal portion of the virtual world also occupied by the virtual character, and said plurality of additional users are not already registered as friends of the user in the virtual environment, where said identifier is selectable by the user to allow the user to extend an invitation to any of the plurality of additional users to become the user's friend, said invitation to be sent to at least one of the additional users selected using the interface that controls one of the additional virtual characters in the communal portion of the virtual world also occupied by the virtual character controlled by the user, and where the plurality of additional users are users who can control additional virtual characters and are not currently a friend of the user;

designating a subset of a combination of the additional users and the additional virtual characters that have received and accepted an invitation to become a friend from the user as friends of the user in the virtual environment and adding the friends to a list of friends associated with the user account;

sending information which causes the user account to be displayed to the user via the user computer; and ranking the friends on the list displayed to the user in an order based at least in part on participation of the virtual character controlled by the user and one or more of the plurality of additional virtual characters controlled by the friends on the list in a common activity within a portion of the virtual environment occupied by both the virtual character and the one or more of the plurality of additional virtual characters, wherein the participation in the common activity affecting the order of the friends comprises involvement of the virtual character controlled by the user and the one or more of the plurality of additional virtual characters in a game in the portion of the virtual environment.

2. The method of claim 1, wherein said ranking the friends on the list comprises ranking a first friend higher than a second friend when a number of interactions between the virtual character and a first additional virtual character corresponding to the first friend is greater than a number of interactions between the virtual character and a second additional virtual character corresponding to the second friend.

3. The method of claim 2, wherein the number of interactions between the virtual character and each of the first and second additional virtual characters is determined during a predetermined period of time before the ranking is performed.

4. The method of claim 3, wherein the predetermined period of time is a period of time that begins approximately when the user account is established and ends approximately when the ranking is performed.

5. The method of claim 1, wherein said ranking the friends on the list comprises ranking a first friend higher than a second friend when a frequency of interactions between the virtual character and a first additional virtual character corresponding to the first friend is greater than a frequency of interactions between the virtual character and a second additional virtual character corresponding to the second friend.

6. The method of claim 1, wherein said designating comprises:

responsive to a request from the user entered via the user computer, transmitting an invitation over the at least one communication network to recipients invited by the user to join the user's list of friends;

receiving an acceptance over the at least one communication network from each of the recipients that has agreed to join the list; and adding to the list as friends each of the recipients that has transmitted their acceptance over the at least one communication network.

7. The method of claim 1, wherein the list of friends comprises less than all additional users and additional virtual characters in the virtual environment.

8. The method of claim 1, wherein representing the toy in the virtual environment comprises validating a registration code transmitted over the at least one communication network, the registration code being associated with the toy; and representing the toy in the virtual environment via a virtual replica of the toy.

9. The method of claim 1 further comprising limiting a number of friends on the list to a predetermined maximum number of allowable friends and preventing said adding of friends to said list if said adding will exceed said predetermined maximum number.

10. The method of claim 1 further comprising:

restricting access to a restricted portion of the virtual environment associated with the virtual character to prevent interactions between additional virtual characters that do not correspond to a friend on the list; and granting access to the restricted portion of the virtual environment to the additional virtual characters that correspond to friends on the list.

11. The method of claim 10, wherein the restricted portion of the virtual environment comprises at least one of:

a virtual room associated with the virtual character;

a virtual toy associated with the virtual character; and a virtual furnishing associated with the virtual character.

12. The method of claim 1, wherein interacting the virtual character with the plurality of additional virtual characters comprises:

transmitting communications between the virtual character and the additional virtual characters in the virtual environment.

13. The method of claim 1, wherein the ranking the friends on the list occurs periodically, at regular intervals of time.

14. The method of claim 1, wherein the ranking the friends on the list occurs substantially in real time upon each interacting of the virtual character with the plurality of additional virtual characters.

15. The method of claim 1, wherein the virtual environment is a website accessible by the user via the user account.

16. The method of claim 1 further comprising transmitting content for presenting the user with a search interface allowing the user to search for a predetermined identifier known by the user to correspond to another user, another virtual character, or both another user and another virtual character the user desires to invite to become a friend.

17. A web server system comprising:

a network connection port through which content is to be served over a communication network to a user computer and a plurality of additional user computers for generating a virtual environment on a website to be viewed by a user via the user computer and by a plurality of additional users via the plurality of additional user computers, wherein the network connection port is configured to serve outbound content to at least ten (10) concurrent client connections over the communication network; and a plurality of computer-readable memory modules forming a storage array operatively connected to the web server system for storing the outbound content to be served via the network connection port, wherein a plurality of the computer-readable memory modules of the redundant array stores substantially similar content to provide at least one backup copy of the substantially similar content, a computer part, communicating with said network connection part and said memory modules, wherein the substantially similar content stored by the computer-readable memory modules and served by said computer part over the communication network to the user computer comprises:

a virtual character that can be controlled by the user in the virtual environment via the user computer, wherein a toy in the real world is represented by the virtual character in the virtual environment, a plurality of additional virtual characters that can be controlled by the plurality of additional users in the virtual environment, wherein a plurality of additional toys in the real world are represented by the plurality of additional virtual characters in the virtual environment, an interface that presents to the user an identifier representing each of a plurality of the additional virtual characters that are present in a communal portion of the virtual environment also occupied by the virtual character, and an invitation tool that is operable by the user to extend a friend invitation to at least one of the additional users controlling one of the additional virtual characters presented in the interface by selecting the identifier corresponding to the at least one of the additional users that is not already registered as a friend of the user's in the virtual environment and is to receive the friend invitation from the interface, and a list, accessible and editable by the user, and including a subset of at least one of the additional characters and the additional users that have become friends of the user in the virtual environment, said friends on the list being ranked in order based at least in part on interactions between the virtual character controlled by the user and the plurality of additional virtual characters participating in a common activity within a portion of the virtual environment that is occupied by both the virtual character and the one or more of the plurality of additional characters during the common activity, wherein access to a restricted portion of the website where the virtual character is to appear and be controlled by the user and the additional characters on the list can appear and be controlled by the additional users is granted to the plurality of additional characters on the list and restricted for other additional characters that are not on the list.

18. The web server system of claim 17, wherein a first friend is ranked higher than a second friend when a number of the interactions between the virtual character and a first additional virtual character corresponding to the first friend is greater than a number of the interactions between the virtual character and a second additional virtual character corresponding to the second friend.

19. The web server system of claim 18, wherein the number of the interactions between the virtual character and each of the first and second additional virtual characters is determined during a predetermined period of time before the friends are ranked.

20. The web server system of claim 19, wherein the predetermined period of time is a period of time that begins approximately when a user account is established for the user and ends approximately when the friends are ranked.

21. The web server system of claim 17, wherein a first friend is ranked higher than a second friend when a frequency of interactions between the virtual character and a first additional virtual character corresponding to the first friend in the virtual environment is greater than a frequency of interactions between the virtual character and a second additional virtual character corresponding to the second friend.

\* \* \* \* \*

UNITED STATES PATENT AND TRADEMARK OFFICE
CERTIFICATE OF CORRECTION

| | |
|---|---|
| PATENT NO. | : 8,464,166 B2 |
| APPLICATION NO. | : 12/369349 |
| DATED | : June 11, 2013 |
| INVENTOR(S) | : Howard Ganz et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 423 days.

Signed and Sealed this
Fifteenth Day of March, 2016

Michelle K. Lee
*Director of the United States Patent and Trademark Office*